US007715820B2

(12) United States Patent
Shin

(10) Patent No.: US 7,715,820 B2
(45) Date of Patent: May 11, 2010

(54) METHOD FOR CONNECTING A CALL IN A MOBILE STATION DURING AN EMERGENCY SITUATION

(75) Inventor: Dong-Soo Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 56 days.

(21) Appl. No.: 10/964,277

(22) Filed: Oct. 13, 2004

(65) Prior Publication Data
US 2005/0096008 A1 May 5, 2005

(30) Foreign Application Priority Data
Oct. 30, 2003 (KR) .................. 10-2003-0076344

(51) Int. Cl.
*H04M 11/04* (2006.01)
(52) U.S. Cl. ................ 455/404.1; 455/414.1; 455/418; 455/419; 455/420; 455/567; 379/45
(58) Field of Classification Search ............. 455/404.1, 455/418, 355; 340/539
See application file for complete search history.

(56) References Cited

U.S. PATENT DOCUMENTS

| 4,845,743 A | | 7/1989 | Lutz | |
|---|---|---|---|---|
| 4,893,329 A | | 1/1990 | O'Brien | |
| 6,011,967 A | * | 1/2000 | Wieck | 455/404.1 |
| 6,075,456 A | * | 6/2000 | Park | 340/825.49 |
| 6,195,572 B1 | * | 2/2001 | Patterson et al. | 455/570 |
| 6,233,330 B1 | | 5/2001 | McClure et al. | |
| 6,351,639 B1 | * | 2/2002 | Motohashi | 455/420 |
| 6,449,497 B1 | | 9/2002 | Kirbas et al. | |
| 6,573,825 B1 | * | 6/2003 | Okano | 340/7.51 |
| 6,606,504 B1 | | 8/2003 | Mooney et al. | |
| 6,696,941 B2 | * | 2/2004 | Baker | 340/539.1 |
| 2001/0023182 A1 | | 9/2001 | Bach et al. | |
| 2002/0068537 A1 | * | 6/2002 | Shim et al. | 455/177.1 |
| 2002/0072348 A1 | * | 6/2002 | Wheeler et al. | 455/404 |
| 2003/0193933 A1 | * | 10/2003 | Jonas et al. | 370/352 |
| 2004/0267884 A1 | * | 12/2004 | Sar-Shalom | 709/206 |
| 2005/0059435 A1 | * | 3/2005 | McKee et al. | 455/567 |
| 2006/0003758 A1 | * | 1/2006 | Bishop et al. | 455/419 |

FOREIGN PATENT DOCUMENTS

| KR | 100139842 | 3/1998 |
|---|---|---|
| WO | WO 00/49829 | 8/2000 |

* cited by examiner

*Primary Examiner*—Vincent P Harper
*Assistant Examiner*—Mazda Sabouri
(74) *Attorney, Agent, or Firm*—The Farrell Law Firm, LLP

(57) ABSTRACT

A method for automatically connecting a call in a mobile station during an emergency situation. In the method a call connection request message including a service identifier previously set for automatic call connection and a password is received. Next, whether the call connection request message is valid is determined using the password included in the received call connection request message. If the call connection request message is valid, devices for outputting an alert signal of the mobile station are turned off, and a response signal for call connection in response to the call connection request message is automatically generated.

10 Claims, 2 Drawing Sheets

METHOD FOR CONNECTING A CALL IN A MOBILE STATION DURING AN EMERGENCY SITUATION

PRIORITY

This application claims priority under 35 U.S.C. §119 to an application entitled "Method for Connecting Call in a Mobile Station" filed in the Korean Intellectual Property Office on Oct. 30, 2003 and assigned Ser. No. 2003-76344, the contents of which are incorporated herein by reference.

BACKGROUND OF THE INVENTION

1. Field of the Invention

The present invention relates generally to a method for connecting a call in a mobile station (MS), and in particular, to a call connection method for automatically performing call connection in response to a call connection request from previously reserved emergency call-available persons.

2. Description of the Related Art

Unfortunately, various kidnapping cases targeted on children and women occur. However, with the popularization of mobile communication, it is very common for an individual such as a child or a woman to carry their own mobile station. Therefore, various methods for dealing with emergency situations such as kidnappings and robberies using mobile stations are being developed.

Conventional methods for handling the emergency situations using mobile stations are commonly divided into (1) a method for transmitting position information to a particular person using a shortcut button of a mobile station, and (2) a method, by a user of a mobile station, for informing of an emergency situation by inputting a special key previously set to inform of an emergency situation to a particular person. However, these types of methods are available only when a user of a mobile station is in an isolated situation where the user is not watched by others, e.g., a person committing a crime, or when the user reports to an emergency center in case of an accident such as a traffic accident. For example, when a user of a mobile station is kidnapped by someone and confined under surveillance, it is impossible for the user to operate the mobile station. In addition, if the kidnapper determines that the user has attempted to inform somebody of the emergency situation using the mobile station, the user may be placed under stricter surveillance or face a dangerous situation.

When a person with their mobile station in hand is kidnapped or confined by somebody, if the mobile station can automatically perform call connection in response to a call connection request from previously reserved emergency call-available persons, e.g., family members or police, without being detected by surroundings, the emergency call-available persons can determine the user's position and damage on a real-time basis through a voice of the user.

Although mobile stations have different call receiving methods according to their types, common mobile stations are available for communication only when a user performs a predetermined operation, for example, pushing a particular button mounted an the outside the mobile station or opening a flip or folder in answer to an incoming call.

In another method, in a special case when a hands-free device is used, a mobile station automatically performs call connection after a lapse of a predetermined time upon receiving an incoming call. Such a method is effective when a user of a mobile station answers an incoming call while driving a vehicle, but the method may cause a side effect such as unintended answering of a call as the call is automatically connected depending upon only a set status of the mobile station without consideration of the current situation of the user.

Therefore, in the conventional call receiving methods, a mobile station cannot always be a help to a user in case of emergency.

SUMMARY OF THE INVENTION

It is, therefore, an object of the present invention to provide a method for transmitting mobile station position information and user information to previously reserved emergency call-available persons on a real-time basis, when the user is in an emergency situation.

It is another object of the present invention to provide a method for automatically performing a call connection in response to a call request from previously reserved emergency call-available persons, without being detected by surroundings.

It is yet another object of the present invention to provide a method for automatically connecting a call in response to a call request from a previously reserved emergency call-available person while protecting the privacy of a user of a mobile station.

To achieve the above and other objects, there is provided a method for connecting a call in a mobile station during an emergency situation. The method comprises: receiving a call connection request message including a service identifier, which is previously set for automatic call connection, and a password; determining whether the call connection request message is valid using the password included in the received call connection request message; turning off any device for outputting an alert signal of the mobile station, if the call connection request message is valid; and automatically generating a response signal for call connection in response to the call connection request message.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

Figure 1:
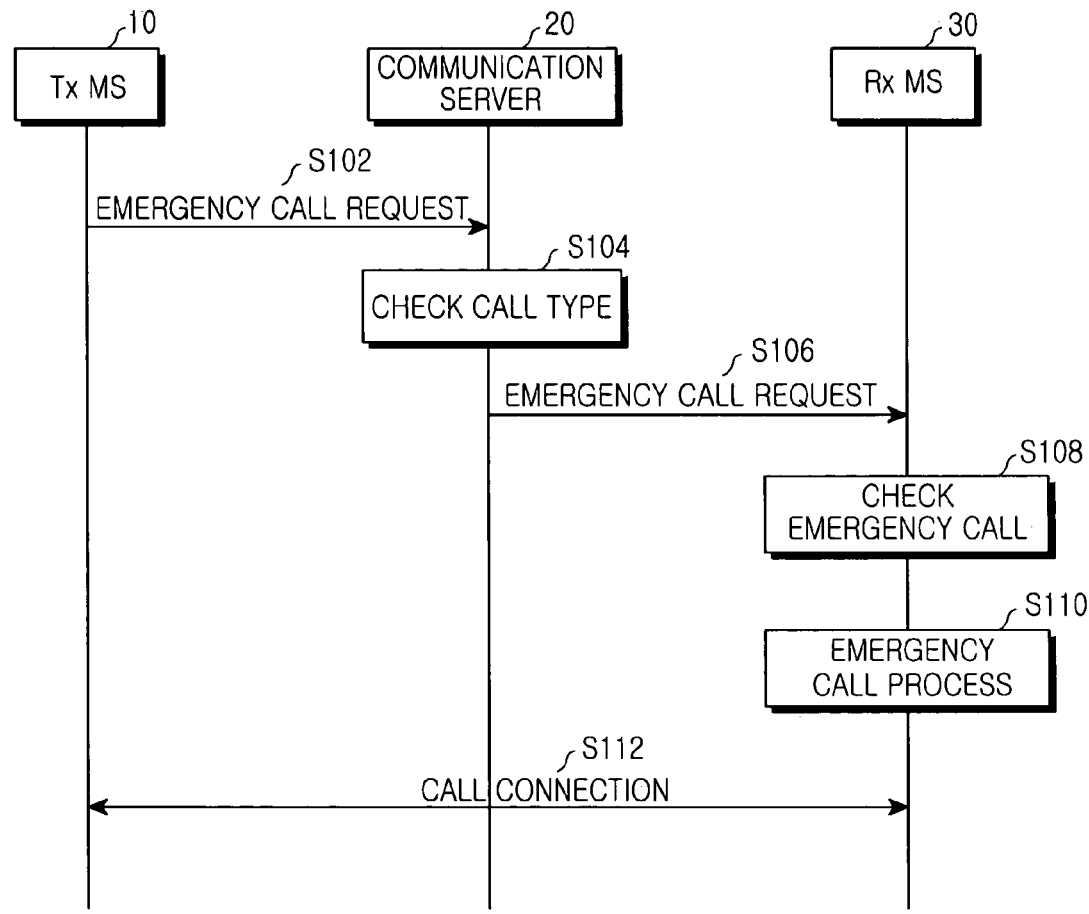
FIG. 1 is a flow diagram illustrating a signaling procedure between a mobile station and a communication server for connecting an emergency call according to an embodiment of the present invention.

FIG. 1 is a flow diagram illustrating a signaling procedure between a mobile station and a communication server for connecting an emergency call according to an embodiment of the present invention. It is assumed herein that a user of a receiving mobile station (Rx MS) 30 has applied to a communication server 20, e.g., a mobile communication service provider, for an emergency call service in which the user can inform previously reserved emergency call-available persons such as family members or police of his emergency situation and that a user of a transmitting mobile station (Tx MS) 10 is a person who was registered as an emergency call-available person for the emergency call service by the user of the receiving mobile station 30. In this case, upon receiving an emergency call request message from the transmitting mobile station 10 in step S102, the communication server 20 analyzes the emergency call request message and determines a type of the call requested by the transmitting mobile station 10 in step S104.

The transmitting mobile station 10 generates an emergency call request message by combining a phone number of the receiving mobile station 30 with a password and a code (e.g., '112') previously reserved to inform an emergency call request of a user, and transmits the generated emergency call request message to the communication server 20. For example, if a phone number of the receiving mobile station 30 is '017-123-4567' and the code is '112', the user of the transmitting mobile station 10 will push a SEND button after inputting '0171234567#112#0000'. Here, the password is a number that was previously registered when the user of the transmitting mobile station 30 was registering the emergency call-available persons in the communication server 20. This prevents an invasion of privacy caused by abuse of such an emergency call function. Then the communication server 20 analyzes information '0171234567#112#0000' included in the call request message received from the transmitting mobile station 10, and determines that the call request is for an emergency call, based on an emergency call identifier '112' in the received information.

If it is determined in step S104 that the received call request message is for an emergency call, the communication server 20 analyzes a password '0000' included in the call request message, and determines whether the emergency call request is valid. Thereafter, in step S106, the communication server 20 sends an emergency call request to the receiving mobile station 30 only when it is determined that the emergency call request is valid.

At this point, the communication server 20 transfers to the receiving mobile station 30 a call request message including an identifier from which the receiving mobile station 30 can determine whether the call request is for an emergency call. As the identifier, the code '112' that is input when the transmitting mobile station 10 requests a call can also be used. If it is determined that the emergency call request is not valid, the communication server 20 rejects the call request.

Upon receiving the call request message from the communication server 20, the receiving mobile station 30 analyzes an identifier included in the received call request message and determines whether the corresponding call is an emergency call in step S108. If it is determined in step S108 that the requested call is an emergency call, the receiving mobile station 30 performs an emergency call process in step S110 and then connects an emergency call in step S112. In step S110, if the requested call is an emergency call, a process of preventing surroundings of the receiving mobile station 30 from detecting that a call connection request is sent to the receiving mobile station 30 is performed. For example, any a speaker, vibrator, or display of the receiving mobile station 30 is turned off, and only a microphone is turned on.

Figure 2:
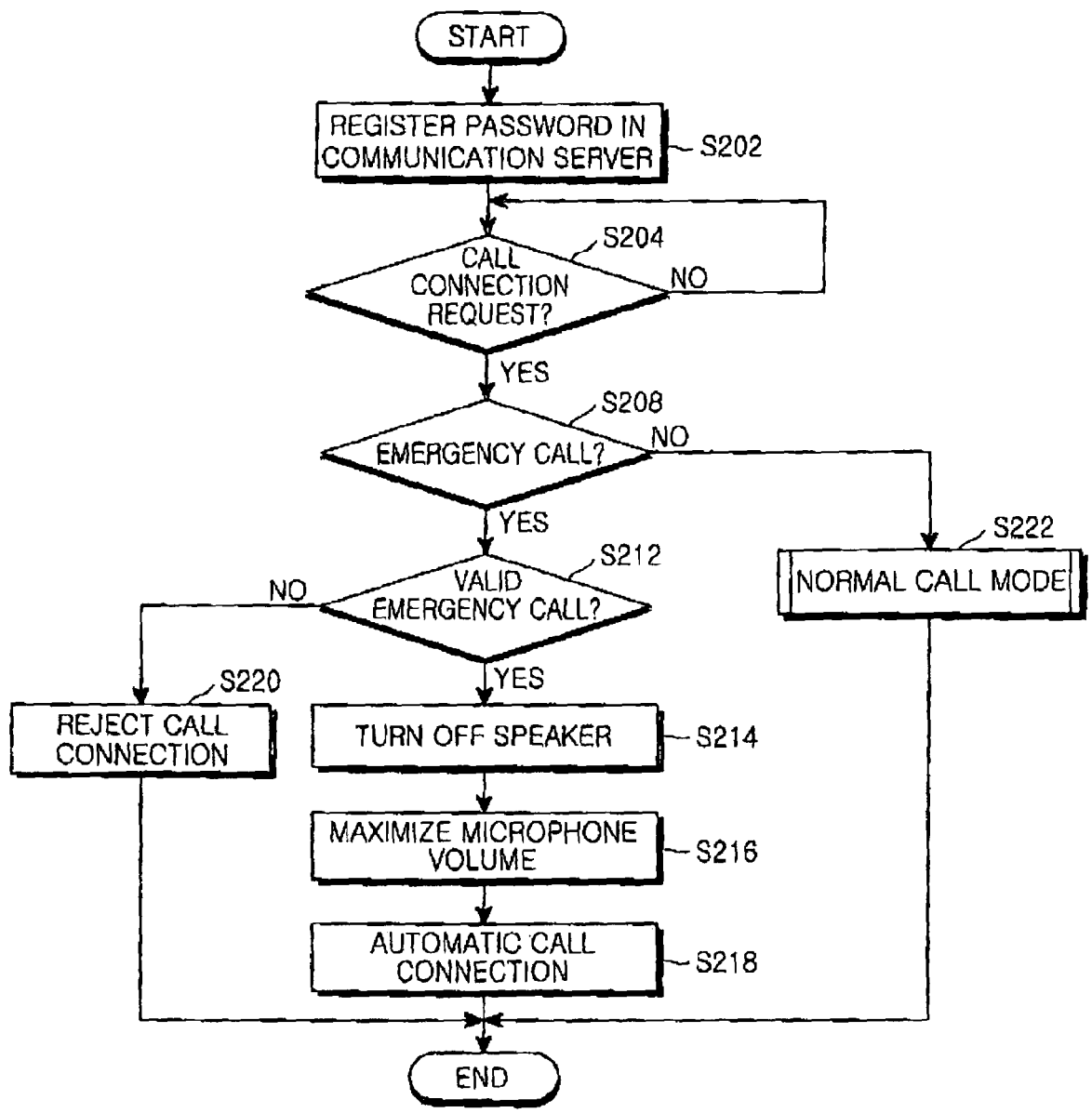
FIG. 2 is a flowchart illustrating a procedure for connecting an emergency call in a mobile station according to an embodiment of the present invention.

FIG. 2 is a flowchart illustrating a procedure for connecting an emergency call in a mobile station according to an embodiment of the present invention. Referring to FIG. 2, a user of a mobile station first applies to a communication server for an emergency call service and then registers a password used for determining whether the service is valid in step S202. Step S202 can be performed using a mobile station as illustrated in FIG. 2, or the user of the mobile station can access a web site of the communication server and then register the password using the Internet. Alternatively, the user can also visit an off-line shop run by the communication service provider or contact the service provider via any telephone to register a password.

If a call connection request is received from another mobile station in step S204, it is determined whether the connection-requested call is an emergency call in step S208. Whether the requested call is an emergency call can be determined by determining whether a specific identifier, e.g., '112', is included in the received call connection request message.

If it is determined that the requested call is an emergency call in step S208, the mobile station analyzes a password to determine whether the emergency call request is valid in step S212. That is, the mobile station determines whether a password included in the call connection request message is valid. For example, the mobile station determines whether a password included in the call connection request message is identical to a password previously registered for an emergency call. If the requested call is not an emergency call, the mobile station operates in a normal call mode in step S222. For example, the mobile station generates an alert signal, e.g., ring tone or vibration, set by the user, and then waits for the user to answer.

If it is determined in step S212 that a password included in the call connection request message is valid, the mobile station turns off a speaker in step S214, maximizes a gain of a microphone in step S216, and automatically connects a call in step S218. For example, the mobile station automatically connects the requested call by automatically generating a response signal for the call connection request. This prevents any indication that the mobile station is performing the call connection by confidentially connecting the requested call.

However, if it is determined in step S212 that a password included in the call connection request message is not valid, the mobile station rejects reception of the corresponding call in step S220. In this case, it is preferable that the mobile station displays a message so that the user can be aware of the rejection.

The emergency call connection according to an embodiment of the present invention can be performed in response not only to a call request from the previously reserved emergency call-available persons but also to a request of a user of the mobile station. That is, in FIG. 2, an emergency call connection is available even when the call request detected in step S204 was made by the user of the mobile station. However, in this case, because the user of the mobile station personally requested call connection, it is preferable to omit the password analysis process in step S212.

Additionally, in order to prevent connection of a normal call when a user of the mobile station faces an emergency situation, it is preferable that when the user of the mobile station has previously informed the communication server of the emergency situation, a normal call request to the corresponding mobile station is rejected. That is, when the user of the mobile station has previously informed the communication server that the user is in an emergency situation, it is preferable that upon receipt of a normal call request to the mobile station, the communication server sends a busy signal to a normal call requesting person to reject requested call connection even though the corresponding mobile station is not busy.

In addition, in order to prevent connection of an emergency call from being failed due to a power-off of the mobile station by a third person, e.g., a kidnaper of the mobile station user, it is preferable that even though the mobile station is turned off, to the mobile station still performs an emergency call when an emergency call request is received or when the user of the mobile station requests an emergency call. To accomplish this, it is preferable that in such a situation, a device such as a display and lamp of the mobile station, which normally indicate that the mobile station is turned on, is turned off, even though the other devices for call connection remain turned on.

In this case, if it is determined that the emergency call is allowed, it is preferable to further include, after step S212, a step of determining whether power of the mobile station is turned on or off, and turning on, if power of the mobile station is turned off, power of only the call connection-related device and a microphone of the mobile station and then maximizing a volume of the microphone.

As is understood from the foregoing description, the present invention provides a method for performing an automatic call connection in response to a call connection request from previously reserved emergency call-available persons in such a manner that any people in surrounding cannot detect the call connection. As a result, a user of a mobile station can transmit information on their position and damage to the previously reserved emergency call-available persons on a real-time basis, in case of an emergency.

In addition, the present invention provides a method for preferentially determining whether an emergency call request is valid by using a password previously set by a user during the application for an emergency call service, thereby minimizing any invasion of privacy when in informing a third person of an emergency situation the user faces. In particular, when a user of a mobile station cannot attempt call connection in an emergency situation such as kidnapping, the mobile station automatically answers an incoming call from a family member and transmits information on the current situation of the user on a real-time basis.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for connecting a call in a system including a communication server and mobile stations during an emergency situation, the method comprising the steps of:

transmitting, by a transmitting mobile station, a call connection request message for an emergency call connection to the communication sewer, the call connection request message including a password and a service code previously set to inform of an emergency call request;

determining, by the communication sewer, whether the call connection request message is intended for the emergency call connection using the service code included in a received call connection request message when the call connection request message is received from the transmitting mobile station:

determining, by the communication server, whether the call connection request message is valid using the password included in the received call connection request message if the call connection request message is intended for the emergency call connection;

transmitting, by the communication server, the call connection request message including an identifier previously set to represent the emergency call connection to a receiving mobile station if the call connection request message is valid;

determining, by the receiving mobile station, whether the call connection request message is intended for the emergency call connection using the identifier included in the call connection request message when the call connection request message is received from the communication server; and turning off, by the receiving mobile station, a speaker and a vibrator of the receiving mobile station, and automatically connecting an emergency call with the transmitting mobile station if the call connection request message is intended for the emergency call connection.

2. The method of claim 1, further comprising setting, by the receiving mobile station, a reception level of a microphone to a maximum value, if it is determined that the call connection request message is valid.

3. The method of claim 1, wherein the previously set password included in the call connection request message is inputted along with a phone number of the receiving mobile station by a user who generated the call connection request message.

4. The method of claim 1, wherein determining, by the communication server, whether the call connection request message is valid comprises:

comparing the password included in the call connection request message with a password previously stored in the receiving mobile station; and determining that the call connection request message is valid, if the password included in the call connection request message is identical to the password previously stored in the receiving mobile station.

5. The method of claim 1, wherein the receiving mobile station turns off the speaker and the vibrator until the emergency call connection ends.

6. A system for connecting a call during an emergency situation, the system comprising:

a transmitting mobile station for transmitting a call connection request message for an emergency call connection to a communication server, wherein the call connection request message includes a password and a service code previously set to inform of an emergency call request;

the communication server for determining whether the call connection request message is intended for the emergency call connection using the service code included in a received call connection request message when the call connection request message is received from the transmitting mobile station, determining whether the call connection request message is valid using the password included in the received call connection request message if the call connection request message is intended for the emergency call connection, and transmitting the call connection request message including an identifier previously set to represent the emergency call connection to a receiving mobile station if the call connection request message is valid; and the receiving mobile station for determining whether the call connection request message is intended for the emergency call connection using the identifier included in the call connection request message when the call connection request message is received from the communication server, turning off a speaker and a vibrator of the receiving mobile station and automatically connecting an emergency call with the transmitting mobile station if the call connection request message is intended for the emergency call connection.

7. The system of claim 6, wherein the receiving mobile station sets a reception level of a microphone to a maximum value, if it is determined that the call connection request message is valid.

8. The system of claim 6, wherein the previously set password included in the call connection request message is inputted along with a phone number of the receiving mobile station by a user who generated the call connection request message.

9. The system of claim 6, wherein the communication server compares the password included in the call connection request message with a password previously stored in the receiving mobile station, and determines that the call connection request message is valid, if the password included in the call connection request message is identical to the password previously stored in the receiving mobile station.

10. The system of claim 6, wherein the receiving mobile station turns off the speaker and the vibrator until the emergency call connection ends.

* * * * *